(12) United States Patent
Huynh et al.

(10) Patent No.: US 9,381,988 B2
(45) Date of Patent: Jul. 5, 2016

(54) ROTATING CIRCULAR AIRFOIL AND PROPELLER SYSTEM

(71) Applicants: Thoi H. Huynh, Seattle, WA (US); Fuji P. Huynh, Seattle, WA (US)

(72) Inventors: Thoi H. Huynh, Seattle, WA (US); Fuji P. Huynh, Seattle, WA (US)

( * ) Notice: Subject to any disclaimer, the term of this patent is extended or adjusted under 35 U.S.C. 154(b) by 1069 days.

(21) Appl. No.: 13/694,082

(22) Filed: Oct. 26, 2012

(65) Prior Publication Data

US 2014/0119934 A1 May 1, 2014

(51) Int. Cl.
*B64C 27/20* (2006.01)
*B63H 1/14* (2006.01)
*B64C 11/00* (2006.01)

(52) U.S. Cl.
CPC .............. *B63H 1/14* (2013.01); *B64C 11/007* (2013.01)

(58) Field of Classification Search
CPC ........ B63H 1/14; B64C 11/007; F01D 5/225; A63H 33/185
USPC .......................................................... 416/189
See application file for complete search history.

(56) References Cited

U.S. PATENT DOCUMENTS

| | | | | | |
|---|---|---|---|---|---|
| 1,542,853 | A | * | 6/1925 | Callahan | 416/91 |
| 2,378,125 | A | * | 6/1945 | Bowman | 416/32 |
| 2,426,742 | A | * | 9/1947 | Pawlowski | 416/189 |
| 2,855,179 | A | * | 10/1958 | Brown | 416/189 |
| 3,124,200 | A | * | 3/1964 | Wilson | 416/93 R |
| 4,301,981 | A | * | 11/1981 | Hartt | B64C 27/32 244/12.2 |
| 5,503,351 | A | * | 4/1996 | Vass | B64C 39/064 244/12.2 |
| 2011/0097209 | A1 | * | 4/2011 | Solorzano | 416/189 |

* cited by examiner

*Primary Examiner* — Dwayne J White
*Assistant Examiner* — Jason Fountain
(74) *Attorney, Agent, or Firm* — Dean A. Craine

(57) ABSTRACT

A rotating circular airfoil system that includes a disc body that has an airfoil shape in cross section. The air foil shape has an angle of attack that is symmetrical. The disc body's includes a circular inner edge which forms a circular center opening and the airfoil shape's leading edge. The disc body also includes an outer edge that forms the airfoil shape's trailing edge. Intersecting ribs extend across the center opening and include a shaft opening that attaches to a rotating shaft. Formed on the top and bottom surfaces of the disc body are evenly spaced apart, extending fins. The fins extend continuously from the inner edge to the outer edge. When a rotating shaft is inserted into the shaft opening and imparts sufficient rotation to the disc body, the fins contact the air forcing it to flow along disc body's top and bottom surfaces and creating a lifting force.

4 Claims, 2 Drawing Sheets

ROTATING CIRCULAR AIRFOIL AND PROPELLER SYSTEM

This invention relates to conventional aerofoil and hydrofoil which produce a force perpendicular to the motion called lift. The well known airfoil principal has been applied in producing fixed wings and propellers for aircrafts. This same principal also has been applied to create lift for high speed watercraft known as hydrofoils Due to the upper curved shape of the airfoil, fluid travels faster for a longer path across the top surface than the bottom surface of the airfoil producing lower pressure over the top surface, therefore creating lift.

Conventional aerofoils and hydrofoils usually must travel through a fluid to create lift. The present invention is for an aerofoil and hydrofoil that does not need to pass through fluids but create lift by rotating about its axis.

BRIEF SUMMARY OF THE INVENTION

The present invention is for a rotating circular airfoil and propeller system with its main body sectional-shape similar to modern airplane wings, having a leading edge and a trailing edge, but is symmetrical about its axis. This circular airfoil and propeller system includes a circular hollow at its center where the leading edge begins and a circular outer edge where its trailing edge ends. Pairs of tee-shape fins attached to the top surface and bottom surface of the main body, runs radiately from the inner edge to the outer edge, to create centrifugal action of fluid when the circular airfoil rotates about its axis. As a result the fluid in contact to the main body is forced to travel from the leading edge to the trailing edge, on the top and bottom, of the rotating circular airfoil. A force perpendicular to this motion, called lift, is created as the circular airfoil continues to rotate about its axis.

BRIEF DESCRIPTION OF THE SEVERAL VIEWS OF THE DRAWING

In the drawings, closely related figures have the same number but different alphabetic suffixes.

Figure 1:
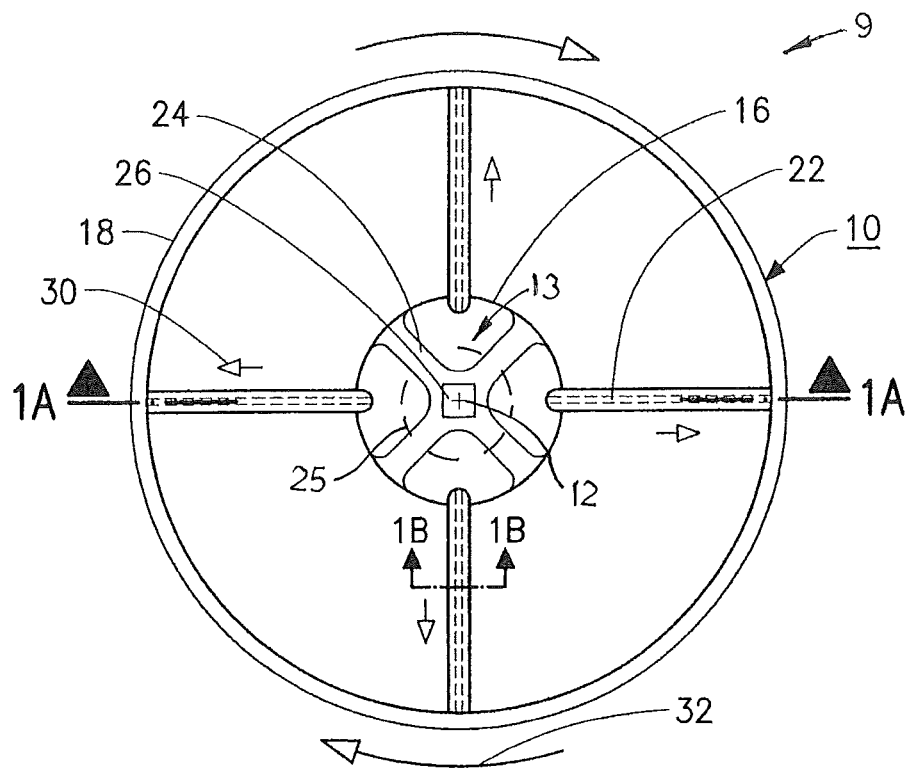
FIG. 1 shows a top view of a rotating circular airfoil and propeller system made in accordance with one embodiment of the present invention.

REFERENCE NUMERAL IN DRAWINGS 9 airfoil system
10 disc body
12 axis of disc body
13 center hole-opening
14 body-sectional-shape of the disc body
15 top surface of the disc body
16 circular inner edge/leading edge of the disc body
17 bottom surface of the disc body
18 circular outer edge/trailing edge of the disc body
20 angle of attack of the airfoil
22 pair of fins
24 spokes
25 intersection section of the spokes
26 center hole
28 lift force of the airfoil
30 air travel direction when the disc body rotates
32 rotating direction of the disc body

DETAILED DESCRIPTION OF THE INVENTION

Referring to FIG. 1, illustrated is a top view of a rotating circular airfoil system 9 made in accordance with a preferred embodiment of the present invention. The system 9 includes a circular disc 10 made to be symmetrical about its axis 12. The disc body 10 has a uniform and symmetrical airfoil shape cross-section 14 and is made of lightweight composite or other suitable materials. A circular hollow center opening 13 is formed in the disc body 10 which is also the leading edge 16 of the airfoil. Pair of fins 22 is made of similar material or of the same as the disc body. Spokes 24 which extend across the center hole opening 13 and intersect at the axis 12 are made of strong material that can be attached to the disc body. Formed centrally in the intersection section 25 of the spokes 24 is a center hole 26 that receives a rotating shaft (not shown)

Figure 1A:
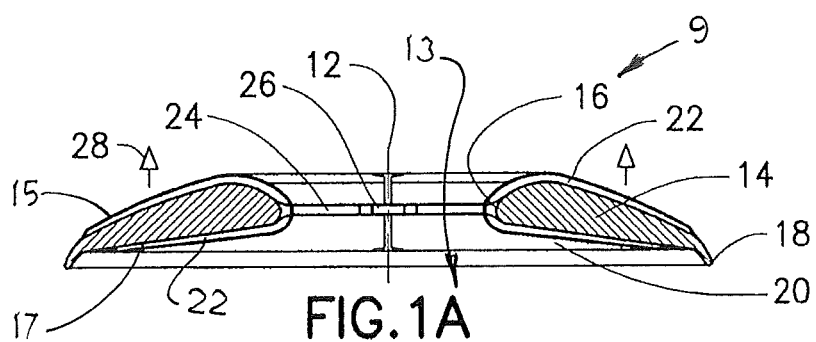
FIG. 1A shows a cross sectional view of the rotating circular airfoil and propeller, taking along line 1A-1A in FIG. 1.

Referring to FIG. 1A, illustrated is a cross-sectional view of the rotating circular airfoil system 9 through line 1A-1A in FIG. 1. The disc body's airfoil shape in cross-section 14 is oriented so that the angle of attack 20 is tilted upward from the outer edge/trailing edge 18 to the inner/leading edge 16. The outer edge 18 is curved downward disc body 10.

Figure 1B:
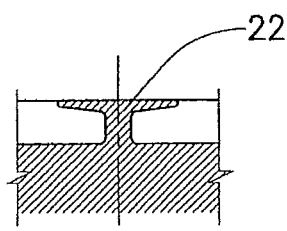
FIG. 1B shows an enlarged cross sectional view of the tee-shape fin of the rotating circular airfoil and propeller system, taking along line 1B-1B in FIG. 1.

Referring to FIG. 1B, illustrated is an enlarged cross-sectional view of the tee-shape fin 22 through line 1B-1B in FIG. 1

Figure 2:
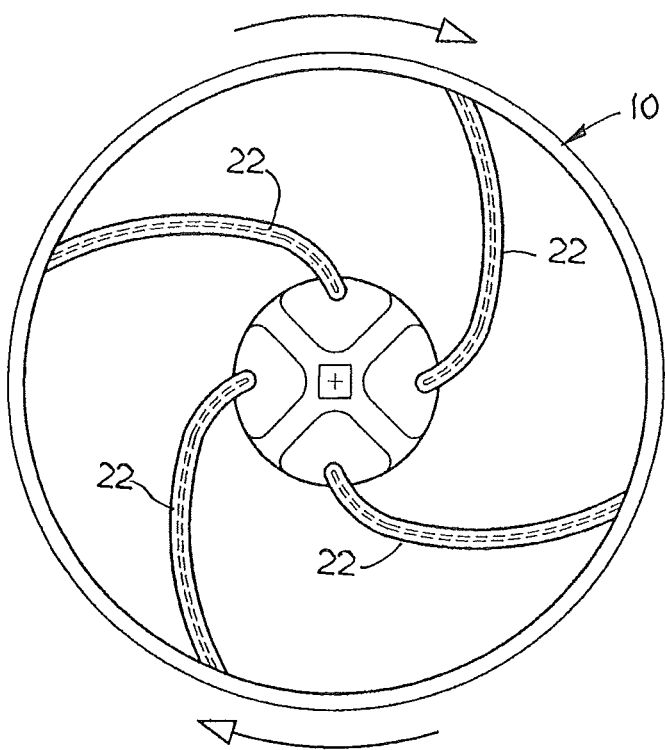
FIG. 2 shows a top view of a rotating circular airfoil and propeller system made in accordance with one embodiment of the present invention with all of the tee-shape fins uniformly curved counterclockwise.

Referring to FIG. 2, illustrated is the top view of a rotating circular airfoil system 9 made in accordance with a preferred embodiment of the present invention as described as in FIG. 1 above; only with all the fins 22 are uniformly curved counterclockwise to improve the aerodynamic of the rotating disc body 10. This alternative embodiment is used when the disc body 10 is made to rotate clockwise only.

Figure 3:
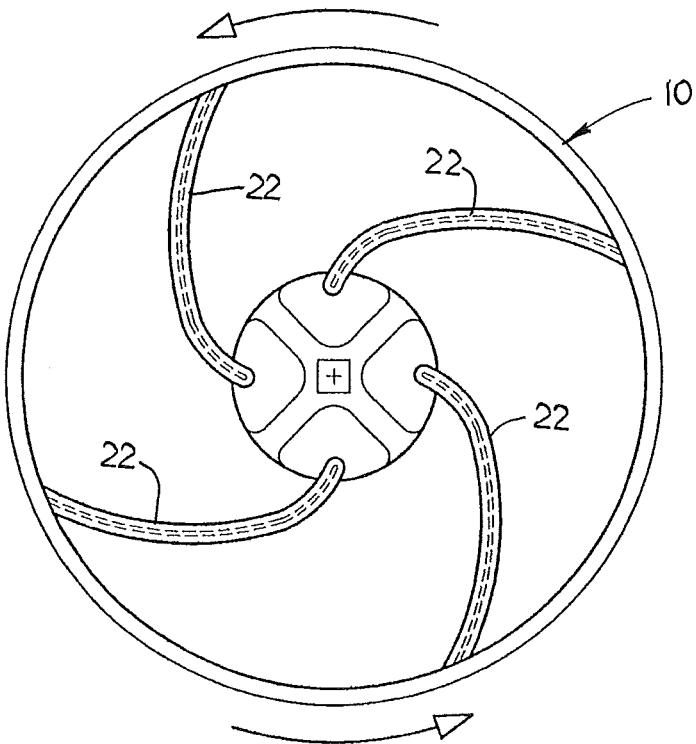
FIG. 3 shows a top view of a rotating circular airfoil and propeller system made in accordance with one embodiment of the present invention with all of the tee-shape fins uniformly curved clockwise.

Referring to FIG. 3, illustrated is the top view of a rotating circular airfoil system 9 made in accordance with a preferred embodiment of the present invention as described as in FIG. 1 above; only with all the fins 22 are uniformly curved clockwise to improve the aerodynamic of the rotating disc body 10. This alternative embodiment is used when the disc body 10 is made to rotate counterclockwise only.

Operation

When a conventional airfoil-shape body moves through the air, fluid travels from the leading edge to the trailing edge, producing a force perpendicular to the motion called lift. Used in water to create lift, the body is known as a hydrofoil. In this present invention, the inner edge 16 of the rotating disc body 10 serves as the leading edge while its outer edge 18 serves as the trailing edge as used in the conventional airfoil. When the circular disc body 10 rotates about it center axis 12, causing the fluid in contact to travel from the inner edge 16 to the outer edge 18 due to the centrifugal action created by fins 22, it produces the same known lift force.

ALTERNATIVE EMBODIMENTS

FIG. 2 shows alternative embodiment to the preferred embodiment, that shown in FIG. 1.

FIG. 3 shows alternative embodiment to the preferred embodiment, that shown in FIG. 1.

The disc body 10 of the rotating circular airfoil is made hollow to reduce weight.

More than two pairs of fins 22 are produced to maximize fluid flow to improve lift.

We claim:

1. A rotating circular airfoil and propeller system, comprising:

a disc body with a circular outer edge and a coaxially aligned center opening, a section of said disc body extending from said outer edge to said center opening having an airfoil shape when viewed in cross-section with an angle of attack tilted upward, said outer edge curved downward from said disc body;

a set of intersecting spokes located inside said central opening;

a center shaft opening formed on the intersecting area of said spokes; and, fixed fins extending outward from said top surface and said bottom surface of said disc body, respectively, each said fin being t-shaped in cross section and extending radially over said disc body.

2. A rotating circular airfoil and propeller system of claim 1, wherein said fins are uniformly curved to the left to improve the aerodynamic of the circular airfoil when said top surface faces upward and is rotated in a clockwise direction to produce lift.

3. A rotating circular airfoil and propeller system of claim 1, wherein said fins are uniformly curved to the right to improve the aerodynamic of the circular airfoil when said top surface faces upward and is rotated in a counterclockwise direction to produce lift.

4. A rotating circular airfoil and propeller system of claim 1, wherein said set of spokes includes four spokes evenly spaced apart and extending across said center opening.

\* \* \* \* \*